United States Patent
Hennessy et al.

(10) Patent No.: US 6,178,469 B1
(45) Date of Patent: Jan. 23, 2001

(54) ENABLING ACCESS TO A SELECTED ONE OF TWO DETECTED SAME TYPE PERIPHERAL DEVICES CONNECTED TO SEPARATE PERIPHERAL SLOTS IN A COMPUTER

(75) Inventors: Rick Hennessy, Lunenburg; David LeClair, Wilmington, both of MA (US); Sanjeev Kumar, Woodinville, WA (US); John Mallard, Saratoga, CA (US)

(73) Assignee: Compaq Computer Corporation, Houston, TX (US)

( * ) Notice: Under 35 U.S.C. 154(b), the term of this patent shall be extended for 0 days.

(21) Appl. No.: 09/107,599

(22) Filed: Jun. 30, 1998

(51) Int. Cl.$^7$ ..................................... G06F 13/14
(52) U.S. Cl. .............................. 710/9; 710/101
(58) Field of Search .................. 710/9, 64, 101

(56) References Cited

U.S. PATENT DOCUMENTS 5,724,529 * 3/1998 Smith et al. ......................... 710/129
5,822,547 * 10/1998 Boesch et al. ....................... 710/103
5,864,688 * 1/1999 Santos et al. ........................ 395/309
5,941,963 * 8/1999 Charles et al. ......................... 710/62

FOREIGN PATENT DOCUMENTS 10-334034 * 12/1998 (JP) ............................... G06F/13/14

\* cited by examiner

*Primary Examiner*—Thomas C. Lee
*Assistant Examiner*—Albert Wang
(74) *Attorney, Agent, or Firm*—Hamilton, Brook, Smith & Reynolds, P.C.

(57) ABSTRACT

A computer has a processor having a bus port operatively connected to a first bus and being operative to selectively access one of a plurality of peripheral devices operatively connected to the bus via at least one of a series of identifiers. The computer also has a peripheral selector for detecting the presence of one or more of the peripheral devices operatively connected to the first and second peripheral ports, for assigning a first of the identifiers to the first peripheral port if one of the peripheral devices is operatively connected to a first peripheral port that is connected to the bus, and for assigning the same first identifier to a second peripheral port that is operatively connected to the bus if the presence of one of the peripheral devices at the first peripheral port is not detected and the presence of one of the peripheral devices at the second peripheral port is detected.

28 Claims, 3 Drawing Sheets

ENABLING ACCESS TO A SELECTED ONE OF TWO DETECTED SAME TYPE PERIPHERAL DEVICES CONNECTED TO SEPARATE PERIPHERAL SLOTS IN A COMPUTER

FIELD OF THE INVENTION

This invention relates generally to communication between computers and their peripheral devices, and more particularly to methods and apparatus that automatically configure such communications.

BACKGROUND OF THE INVENTION

Relatively sophisticated portable computers are now readily available. These can include powerful processors capable of addressing a number of different peripherals on different types of busses. For example, floppy drives, hard drives, and modems have been developed for the family of buses and interface connectors developed for the so-called IBM-compatible personal computer line and its progeny. Standards in this family include the PCI, ISA, IDE, and PCMCIA standards.

Although these sophisticated machines can now support a large number of software applications and interact with several different peripheral devices, users do not always need all of these capabilities. To this end, docking stations, port replicators, and portable external peripheral devices have been developed. These devices have allowed users to reduce the amount of hardware they carry with them, but they do not always present a solution that provides the user with optimal flexibility.

SUMMARY OF THE INVENTION

In one general aspect, the invention features a computer with a processor having a bus port operatively connected to a first bus and being operative to selectively access one of a plurality of peripheral devices operatively connected to the bus via at least one of a series of identifiers. The computer also includes a peripheral selector for detecting the presence of one or more of the peripheral devices operatively connected to the first and second peripheral ports, for assigning a first of the identifiers to the first peripheral port if one of the peripheral devices is operatively connected to a first peripheral port that is connected to the bus, and for assigning the same first identifier to a second peripheral port that is operatively connected to the bus if the presence of one of the peripheral devices at the first peripheral port is not detected and the presence of one of the peripheral devices at the second peripheral port is detected.

The first peripheral port can be operatively connected to the first bus via a second bus and a first bridge, whereby the first bridge is operatively connected between the first and second busses. The first bridge can operate in positive addressing mode. The computer can include a processor and user interface housing that includes the processor, the first bus, the second bus, the first bridge, the first peripheral port; and a first docking port, and a docking station that includes the second peripheral port and a second docking port constructed and adapted to interface with the first docking port, a second bus adapter operatively connected between the second docking port and a third bus, and wherein the second peripheral port is operatively connected to the third bus. The first bus can be a high speed mezzanine bus with the second bus being a peripheral bus having a lower data rate than the first bus. The first bus can be a PCI bus, with the second and third busses being ISA buses, and with the first and second bridges being PCI/ISA bridges. The first bridge can operate in positive addressing mode and the second bridge can operate in subtractive addressing mode. The peripheral selector can be operative to disable an address range for the first peripheral port to select the second peripheral port. The computer can be a portable computer including a portable housing, with the first peripheral port being built into a first portion of the housing, and with the second peripheral port being a docking port built into a second portion of the housing. The computer can include a bootstrapping module operative to invoke the peripheral selector upon booting the computer to access one of the peripheral devices as a default boot drive. The identifier can be a system drive letter. The identifier can be a hardware address. The first and second peripheral devices can be disk drives. The computer can include a hot swap module operative to invoke the peripheral selector upon detecting the installation or removal of one of the peripheral devices from one of the first and second peripheral ports. The hot swap module can be operative to generate a system-level interrupt. A first controller can be operatively connected to one of the peripheral devices, for operative connection to the first peripheral port. The first and second peripheral devices can be floppy disk drives. The computer can further include a second controller for operative connection between the one of the peripheral devices and the second peripheral port.

In another general aspect, the invention features a method of operating a computer that includes detecting the presence of one or more peripheral devices operatively connected to one or both of first and second peripheral ports, assigning a first of the identifiers to the first peripheral port if one of the peripheral devices is detected at the first peripheral port, and assigning the same first identifier to the second peripheral port if the presence of one of the peripheral devices at the first peripheral port is not detected in the step of detecting and the presence of one of the peripheral devices at the second peripheral port is detected.

The method can include accessing one of the peripheral devices at one of the peripheral ports using the identifier, with the step of accessing one of the peripheral devices including performing a bus conversion. The method can include detecting a swap event involving one of the peripheral ports and thereafter accessing the other of the peripheral ports using the identifier, with the step of accessing the other of the peripheral ports including performing a bus translation. The method can include detecting a swap event involving one of the peripheral ports and thereafter accessing the other of the peripheral ports using the identifier, with the step of accessing the other of the peripheral ports including performing a bus conversion. The steps of assigning can allow for access to the first peripheral port using a positive addressing mode and access to the second peripheral port using a subtractive addressing mode. The method can include disabling an address range for the first peripheral port to select the second peripheral port if the if the presence of one of the peripheral devices at the first peripheral port is not detected and the presence of one of the peripheral devices at the second peripheral port is detected.

In another general aspect, the invention features a memory for storing data for access by a processor within a computer, including code operative on the processor to detect the presence of one or more peripheral devices operatively connected to one or both of first and second peripheral ports, code operative on the processor to assign a first of the identifiers to the first peripheral port if one of the peripheral devices is detected at the first peripheral port, and code operative on the processor to assign the same first identifier to the second peripheral port if the presence of one of the peripheral devices is not detected at the first peripheral port and the presence of one of the peripheral devices is detected at the second peripheral port.

The code operative on the processor to assign can allow for access to the first peripheral port using a positive addressing mode and access to the second peripheral port using a subtractive addressing mode. The memory can include code operative to disable an address range for the first peripheral port to select the second peripheral port if the presence of one of the peripheral devices at the first peripheral port is not detected and the presence of one of the peripheral devices at the second peripheral port is detected.

Systems according to the invention are advantageous in that they permit users to easily choose whether to carry a peripheral device within a portable computer housing, or to install it in a docking station. This decision will be transparent to the user, even if the bus protocols for the two peripheral ports are different, and even if the peripheral device is a boot device. And by providing hot swapping capabilities, ease of use and transparency are further enhanced.

DETAILED DESCRIPTION OF AN ILLUSTRATIVE EMBODIMENT

Figure 1:
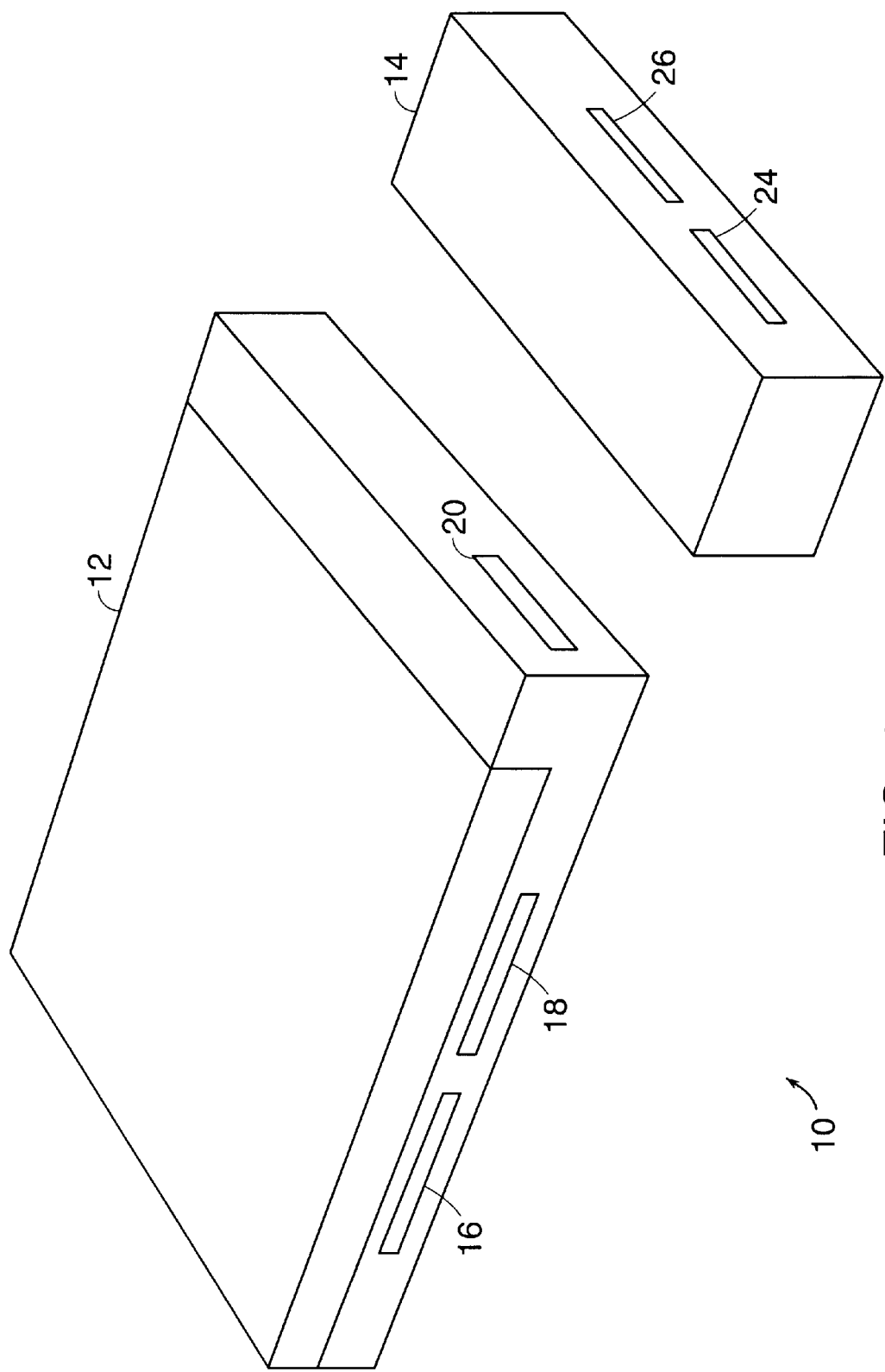
FIG. 1 is a perspective outline drawing of a portable computer according to the invention.

Referring to FIG. 1, a portable computer system 10 according to the invention includes a main computer unit 12 and a docking station 14. The main computer unit is a self-sufficient, battery-powered computer with a processor, memory, and user interface hardware, such as a keyboard, touch pad, and display screen. The main computer unit's housing can be in the form of a clam-shell case with the keyboard and display being mounted in hingedly attached portions. The main computer unit also has one or more peripheral interface slots 16, 18. These slots each include a connector that allows a peripheral device, such as a floppy disk drive, network interface, or modem, to be inserted into its slot and carried with the computer.

A docking connector 20 is also located on the main computer unit. This connector mates with a corresponding docking connector on the docking interface. The docking interface includes one or more peripheral slots 24, 26, which exhibit a form factor and electrical specification similar to those of the peripheral slots in the main computer unit, so that peripheral devices can be swapped between the main computer unit and the docking station housing.

Figure 2:
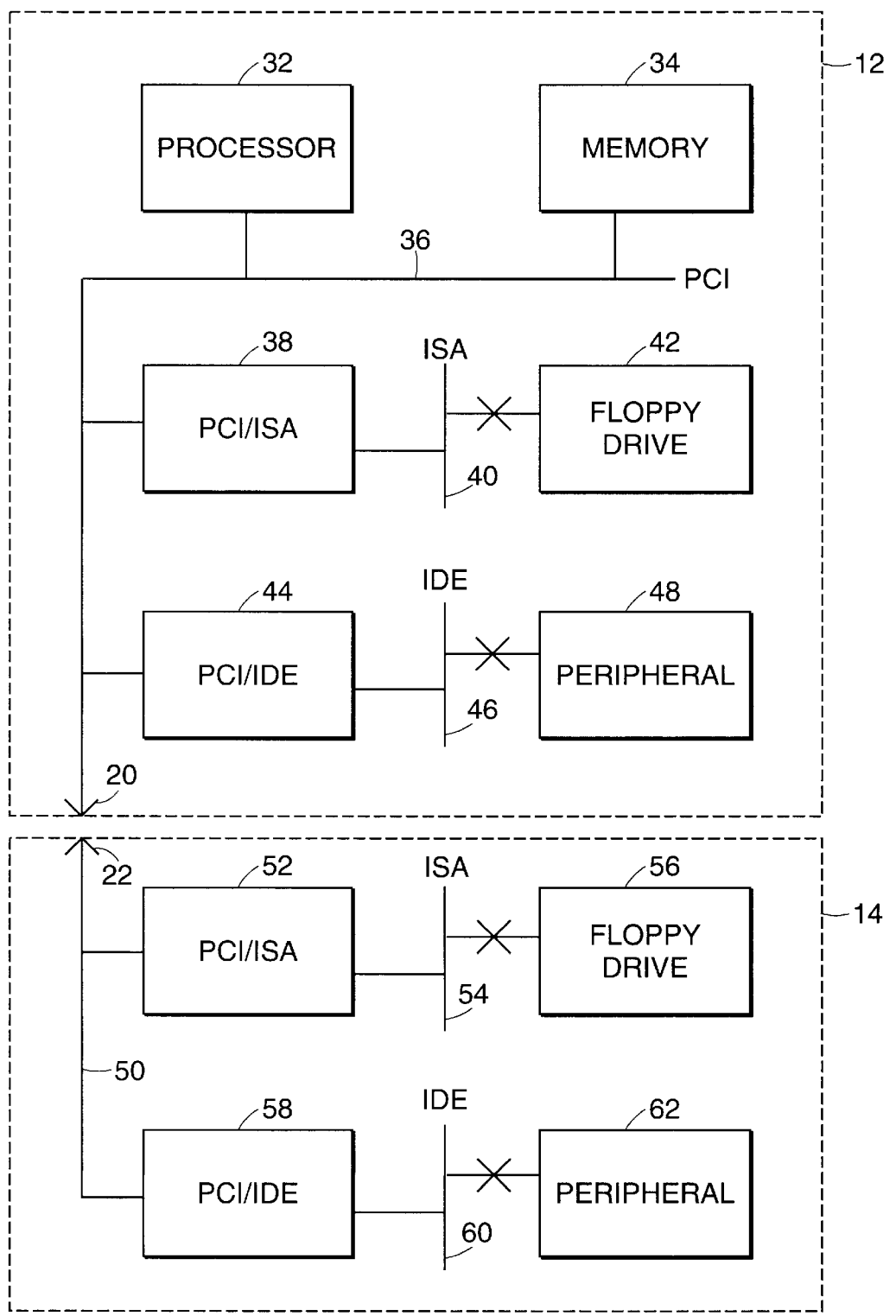
FIG. 2 is a block diagram of the portable computer of FIG. 1.

Referring also to FIG. 2, the main computer unit 12 includes a processor 32 and memory 34 each having a port operatively connected to a first bus 36. This first bus can be a Peripheral Component Interface (PCI) bus, which is a relatively high-speed mezzanine bus with burst transfer and automatic configuration capabilities.

Also provided in the main computer unit 12 is a first bridge 38, which is operatively connected between the first bus 36 and a second bus 40. The second bus can be an Industry Standard Architecture (ISA) bus. The ISA bus is an extension of the original IBM-XT bus architecture, which runs at 8 MHz and allows for bus mastering. A first peripheral device 42, such as a floppy drive, can also be operatively connected to a controller connected to the second bus via an interface connector in the first of the peripheral interface slots 14.

A second bridge 44 is operatively connected to the first bus 36 and to a third bus 46. The third bus can be an Integrated Drive Electronics (IDE) interface bus, which is a bus based on the ISA bus and designed to handle power and data signal interfaces between a computer and integrated disk controller and drive. The third bus can also be connected to another peripheral 48, such as a hard drive or a CD-ROM device via an interface connector in a second of the peripheral interface slots 16.

The first bus 36 within the main computer unit 12 is also operatively connected to the docking connector 20. This docking connector 20 can mate with the second docking connector 22, which is mounted on the housing of the docking station 14. The second connector is operatively connected to a first bus 50 within the docking station. This bus can also be a PCI bus.

A first bridge 52 is connected between the first bus 50 and a second bus 54, which can be an ISA bus. A controller connected to the second bus can be operatively connected to a first peripheral 56, such as a floppy drive, via an interface connector in a first of the peripheral interface slots 24 in the docking station 14. A second bridge 58 is also operatively connected to the first bus of the docking station and to a second bus 60 of the docking station. This bus can be an IDE bus, that can also be operatively connected to a second peripheral 62, which can be a hard drive, via an interface connector in a second of the peripheral interface slots 26 in the docking station.

Figure 3:
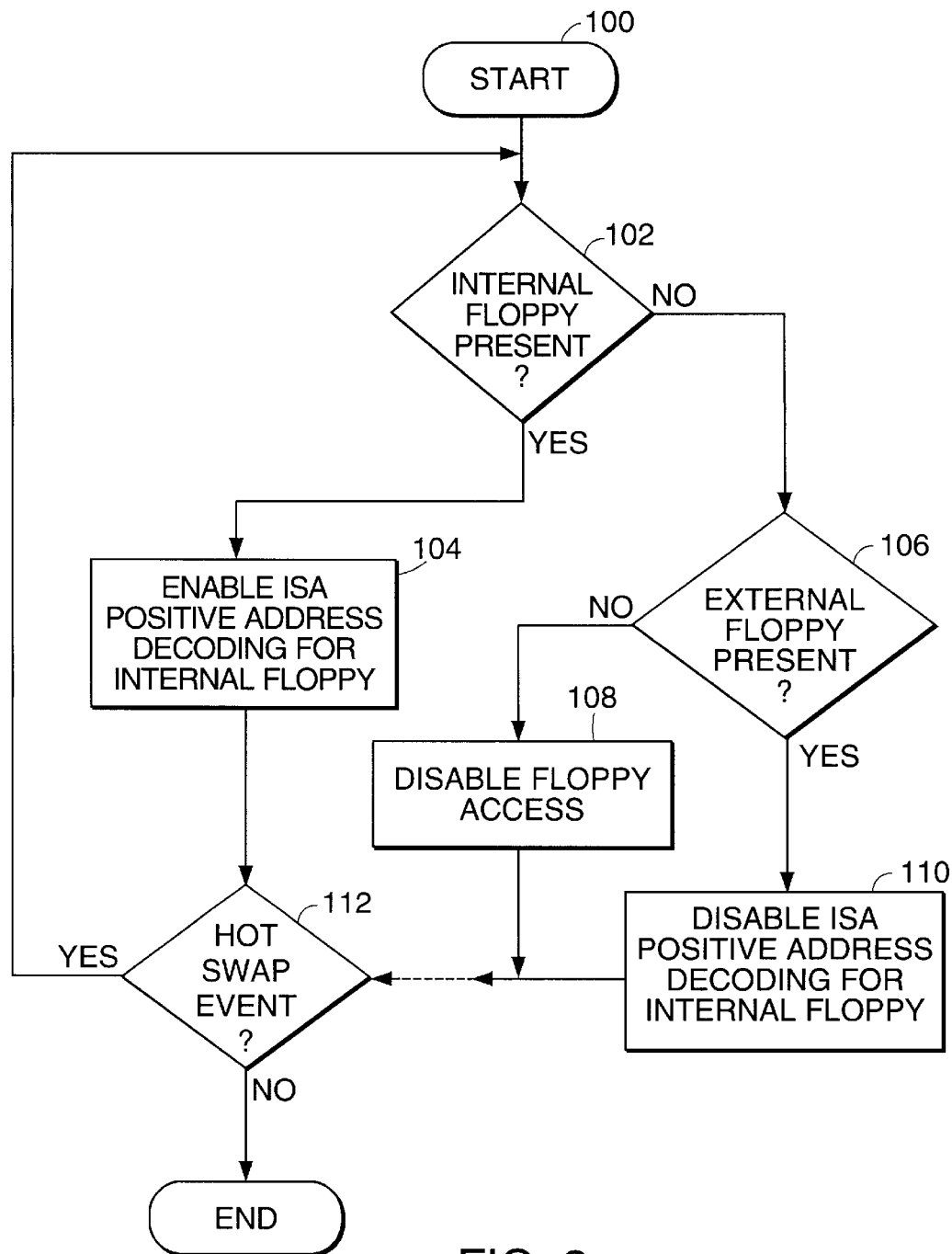
FIG. 3 is a flowchart illustrating the operation of the portable computer of FIG. 1.

In operation, referring to FIGS. 1–3, during initial boot-up of the computer 12, the processor 32 will run a boot routine, which is typically stored in a non-volatile portion of the memory 34. One of the functions of the boot routine is to initialize peripheral devices, so that larger boot segments can be loaded into the processor. To this end, the boot routine begins a peripheral initiation routine (step 100).

The peripheral initiation routine begins by configuring and accessing a boot device, that will generally include further boot code. To this end, the routine first determines whether a predetermined internal boot floppy drive, (e.g., A: in an IBM-compatible system), is present in the first peripheral interface slot (step 102) in the main computer unit 12. If a floppy drive is detected in the slot, the addressing on the first bus 36 is configured to access the floppy drive through the first bridge 38 via positive addressing (step 104). This is done by reserving a portion of the PCI address space for the floppy drive. On an IBM-compatible computer, the reserved address space is typically 3F0–3F7 for the initial first floppy drive. The boot routine also allocates an interrupt request channel (e.g., IRQ06) and a DMA channel (e.g., 02) to the drive. The computer's file system will also assign a drive identifier (e.g., A:) to the floppy.

If no floppy drive is detected in the main computer unit 12, a routine determines whether a floppy drive is present in the first peripheral interface slot 24 of the docking station 14 (step 106). If there is no floppy drive in the docking station, the system ceases to seek access to a floppy drive, and continues its boot routine (step 108).

If a floppy is detected in the docking station 14, the routine disables positive address decoding for the slot used for the internal floppy drive in the main computer unit 12

(step 110). This leaves the I/O addresses for the floppy unallocated within the first bus 36. The first bus adapter 52 in the docking station 42, however, is programmed to operate in subtractive addressing mode, so that this adapter will "claim" any bus access that is not assigned to an active address within the first bus 36.

The user can also move the drives from the expansion slots in the main computer unit 12 to the expansion slots in the docking station 14, and vice-versa, while they are powered-up ("hot swap"). A hot swap event is detected when a floppy drive is removed or inserted into the main computer unit or the docking station (step 112). This causes a system-level interrupt to start a floppy drive initiation routine that is similar to that followed upon boot up.

The bus allocation method presented above permits an individual floppy drive, or other peripheral, to be placed in either an peripheral interface slot of the main computer unit 12 or an peripheral interface slot of the docking station 14. This dual-floppy capability can be transparent to the user, who needs only physically move the drive, even if the bus decoding methods are different, which can arise if positive address decoding can only be enabled for a single peripheral.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A computer, comprising:
   a first bus,
   a processor operatively connected to the first bus and being operative to selectively access peripheral devices operatively connected to the first bus;
   a first peripheral slot operatively connected to the first bus;
   a second peripheral slot operatively connected to the first bus; and
   a memory including a peripheral selector, the peripheral selector upon detecting a peripheral device operatively connected to the first peripheral slot and a peripheral device of the same type operatively connected to the second peripheral slot, selecting one of the detected same type peripheral devices for use by the computer, enabling access to the selected peripheral device and disabling access to the non-selected peripheral device.

2. The computer of claim 1 wherein the first peripheral slot is operatively connected to the first bus via a second bus and a first bridge, whereby the first bridge is operatively connected between the first and second busses.

3. The computer of claim 2 wherein the first bridge operates in positive addressing mode.

4. The computer of claim 2 wherein the computer includes:
   a processor and user interface housing that includes the processor, the first bus, the second bus, the first bridge, the first peripheral slot, and a first docking port; and
   a docking station that includes the second peripheral slot and a second docking port constructed and adapted to interface with the first docking port, a second bus adapter operatively connected between the second docking port and a third bus, and wherein the second peripheral slot is operatively connected to the third bus.

5. The computer of claim 4 wherein the first bus is a high speed mezzanine bus and wherein the second bus is a peripheral bus having a lower data rate than the first bus.

6. The computer of claim 5 wherein the first bus is a PCI bus, wherein the second and third busses are ISA buses, and wherein the first and second bridges are PCI/ISA bridges.

7. The computer of claim 4 wherein the first bridge operates in positive addressing mode and wherein the second bridge operates in subtractive addressing mode.

8. The computer of claim 7 wherein the peripheral selector is operative to disable an address range for the first peripheral slot to select the second peripheral slot.

9. The computer of claim 1 wherein the peripheral selector is operative to disable an address range for the first peripheral slot to select the second peripheral slot.

10. The computer of claim 1 wherein the computer comprises a main computer unit and a docking station, wherein the first peripheral slot is built into the main computer unit, and wherein the second peripheral slot is built into the docking station.

11. The computer of claim 1 further including a boot-strapping module operative to invoke the peripheral selector upon booting the computer to select one of the same type peripheral devices as a default boot drive.

12. The computer of claim 1 wherein the selected same type peripheral device is identified by a system drive letter.

13. The computer of claim 1 wherein the selected same type peripheral device is identified by a hardware address.

14. The computer of claim 1 wherein the same type peripheral devices are disk drives.

15. The computer of claim 1 wherein the same type peripheral devices are floppy disk drives.

16. The computer of claim 1 further including a hot swap module operative to invoke the peripheral selector upon detecting the installation or removal of one of the peripheral devices from one of the first and second controllers.

17. The computer of claim 16 wherein the hot swap module is operative to generate a system-level interrupt.

18. The computer of claim 1 further including a first controller operatively connected to one of the peripheral devices, for operative connection to the first peripheral slot.

19. The computer of claim 18 further including a second controller for operative connection between the one of the peripheral devices and the second peripheral slot.

20. A method of operating a computer, comprising:
   detecting the presence of a peripheral device operatively connected to a first peripheral slot and a peripheral device of the same type operatively connected to a second peripheral slot;
   selecting one of the detected same peripheral devices for use by the computer;
   enabling access to the selected peripheral device; and
   disabling access to the non-selected peripheral device.

21. The method of claim 20 further including the step of accessing the selected peripheral device, wherein the step of accessing includes performing a bus conversion.

22. The method of claim 21 further including the step of detecting a swap event involving one of the peripheral slots and thereafter enabling access to the other of the peripheral slots, wherein the step of accessing the other of the peripheral slots includes performing a bus translation.

23. The method of claim 20 further including the step of detecting a swap event involving one of the peripheral slots and thereafter enabling access to the other of the peripheral slots, wherein the step of accessing the other of the peripheral slots includes performing a bus conversion.

24. The method of claim 20 wherein the steps of assigning allow for access to the first peripheral slot using a positive addressing mode and access to the second peripheral slot using a subtractive addressing mode.

25. The method of claim 20 further including the step of disabling an address range for the first peripheral slot to select the second peripheral slot if the presence of one of the peripheral devices at the first peripheral slot is not detected and the presence of one of the peripheral devices at the second peripheral slot is detected.

26. A memory for storing data for access by a processor within a computer, including:

code operative on the processor to detect the presence of a peripheral device operatively connected to a first peripheral slot and a peripheral device of the same type operatively connected to a second peripheral slot, code operative on the processor to select one of the detected same type peripheral devices for use by the computer;

code operative on the processor to enable access to the selected peripheral device; and code operative on the processor to disable access to the non-selected peripheral device.

27. The memory of claim 26 wherein the code operative on the processor to select allows for access to the first peripheral port using a positive addressing mode and access to the second peripheral port using a subtractive addressing mode.

28. The memory of claim 26 further including code operative to disable an address range for the first peripheral slot to select the second peripheral port if the presence of one of the peripheral devices at the first peripheral slot is not detected and the presence of one of the peripheral devices at the second peripheral slot is detected.

* * * * *